United States Patent [19]
Ramsey et al.

[11] Patent Number: 5,826,705
[45] Date of Patent: Oct. 27, 1998

[54] CONVEYOR BELT ASSEMBLY WITH HEADED RETENTION SHAFT

[75] Inventors: Earl A. Ramsey, Sinking Spring; Jeffrey E. DeLair, Wyomissing, both of Pa.

[73] Assignee: Omni Manufacturing Co., Reading, Pa.

[21] Appl. No.: 755,599

[22] Filed: Nov. 25, 1996

[51] Int. Cl.⁶ ................................................. B65G 17/06
[52] U.S. Cl. ........................................... 198/853; 474/218
[58] Field of Search ................................. 198/850, 851, 198/853; 474/218

[56] References Cited

U.S. PATENT DOCUMENTS

| | | | |
|---|---|---|---|
| 3,066,549 | 12/1962 | Benjamin | 198/853 |
| 3,344,907 | 10/1967 | Van Valkenburgh | 198/851 |
| 3,774,752 | 11/1973 | Harvey . | |
| 4,345,730 | 8/1982 | Leuvelink | 198/853 |
| 4,974,724 | 12/1990 | Lapeyre . | |
| 5,058,732 | 10/1991 | Lapeyre . | |
| 5,332,084 | 7/1994 | Greve | 198/853 |
| 5,339,946 | 8/1994 | Faulkner et al. . | |
| 5,566,817 | 10/1996 | Meeker | 198/853 |
| 5,573,106 | 11/1996 | Stebnicki | 198/853 |

Primary Examiner—Joseph E. Valenza
Assistant Examiner—Knoi H. Tran
Attorney, Agent, or Firm—Nixon & Vanderhye

[57] ABSTRACT

The conveyor belt assembly includes links having forward and rearwardly laterally spaced projections with forward and rearward projections of adjacent links being interdigitated and coupled to one another by a shaft passing through the aligned openings of the link projections. The shaft includes a headed end having two retainer sections with projections extending in diametrically opposite directions outside of the peripheral confines of the shaft. Diametrically opposite inset portions at axially spaced locations are also provided. By inserting the non-headed end of the shaft through the aligned openings and pressing the headed end through the first opening, the headed end is deformed laterally, first in one direction and then in an opposite direction, in order to pass through the end opening into a lock cavity. The projections prevent axial movement of the shaft in respective opposite directions.

19 Claims, 6 Drawing Sheets

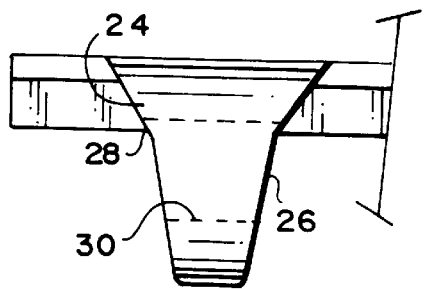
Fig. 3
Fig. 4
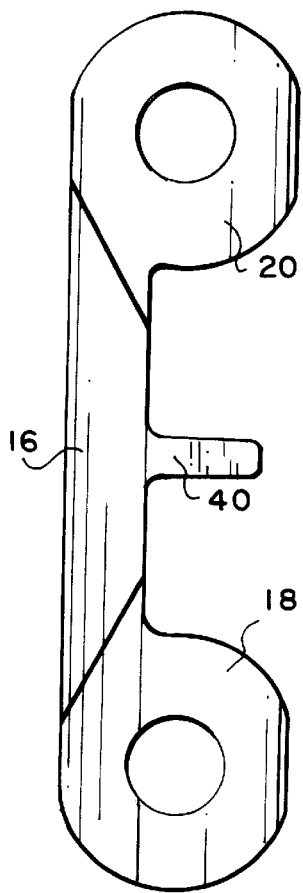
Fig. 5
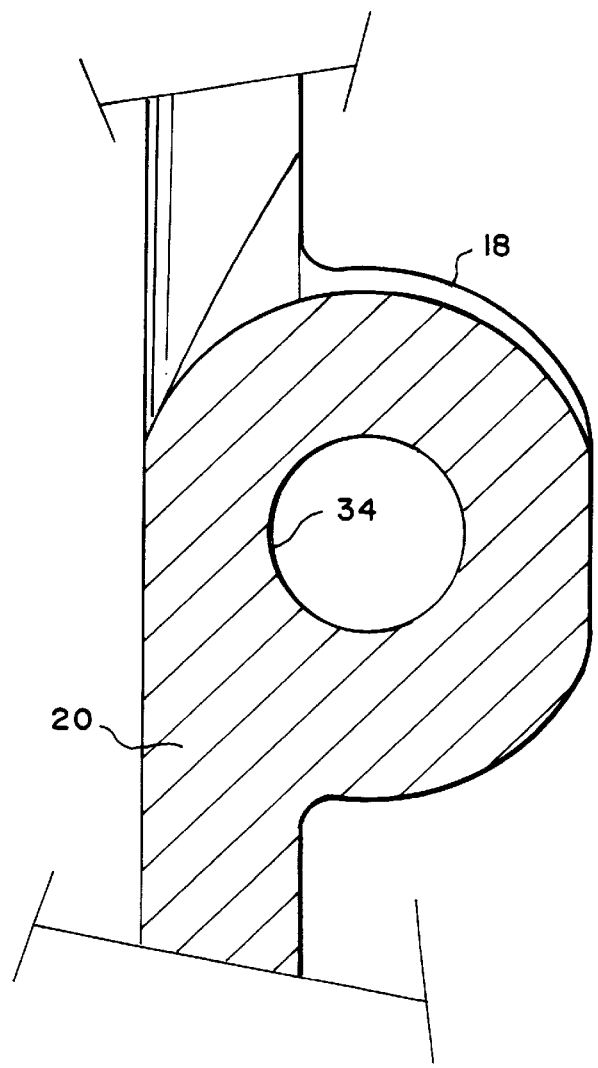

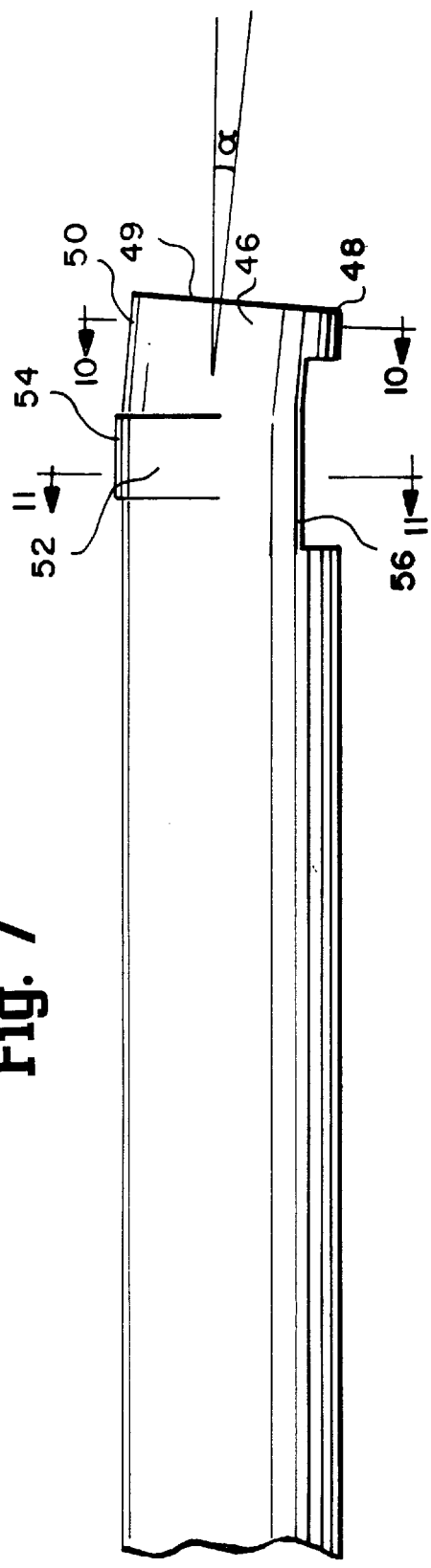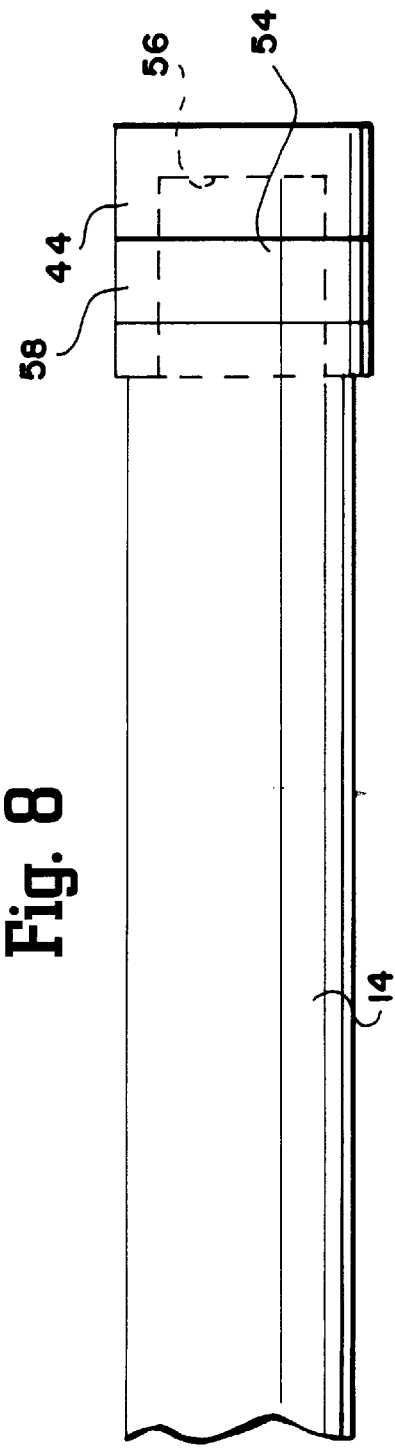

CONVEYOR BELT ASSEMBLY WITH HEADED RETENTION SHAFT

TECHNICAL FIELD

The present invention relates to a conveyor belt assembly formed of a plurality of discrete links having forward and rearward laterally spaced projections for interdigitation and particularly to a connecting link shaft having a shaped headed end, the shaft pivotally and releasably securing the adjacent links to one another with the headed end cooperating with a pair of end interdigitated links to releasably secure the shaft to the links.

BACKGROUND

Conveyor belts having discrete links with each of the links having forward and rearward laterally spaced projections, and the links being interdigitated and coupled to one another by a shaft passing through openings of the projections are well known. One of the problems associated with links of this type, however, is the requirement for an end lock or cap for securing the shaft in the link assembly. Typically, the end lock or end cap is a separate piece which requires locking engagement with the end of the shaft or a deformation, for example, by heat or soldering, to prevent the shaft from being displaced axially from the adjoining links. Thus, to disassemble the conveyor links as is done frequently and periodically in many fields of use, for example, for cleaning the conveyors in the food products industry, it is necessary to cut the head end of the shaft in order to remove the shaft and separate the links. Not only does this require each shaft to be cut to remove each link from the conveyor but the cutting of the head prevents the shaft from being reused, thereby necessitating use of a new link shaft upon reassembly of the conveyor. Consequently, there has developed a need for a link shaft which can be readily and easily applied to securely join adjacent links of a conveyor assembly and which link shaft can be removed and reused to reassemble the links to once again form the conveyor.

DISCLOSURE OF THE INVENTION

According to the present invention, there is provided a conveyor assembly having a plurality of links, each of which has forward (leading) and rearward (trailing) projections such that the forward and trailing projections of adjoining links can be interdigitated one with the other and secured for pivotal movement by insertion of a link shaft through aligned openings of the projections. The forward projections preferably have sides which are step-tapered, i.e., have two adjoining linearly extending, angularly related sections along each side, and a central, laterally extending opening for receiving a link shaft. The trailing edge projections preferably have tapered side walls and a central, laterally extending opening for alignment with the openings of the forward projections and reception of a link shaft joining the links to one another. An end trailing projection has a locking slot or notch formed along its inside face for receiving the uniquely shaped headed end of the locking shaft.

The locking shaft comprises an elongated shaft or rod of circular cross-section having a plain end and a headed end. The headed end includes first and second retainer sections. The first retainer section lies adjacent the terminal end or end face of the shaft and has a first portion projecting outwardly of the peripheral confines (diameter) of the shaft and along one side of the shaft. The opposite side of the shaft has a first portion inset (tapered) from the peripheral confines (diameter) of the shaft. The second retainer section has a second portion axially inwardly from the end of the shaft and the first retainer section and which second retainer portion projects outwardly of the peripheral confines (diameter) of the shaft along the opposite side of the shaft. On the same side of the shaft as the first projecting retainer portion, the second retaining section has a second portion inset from the peripheral confines (diameter) of the shaft. The first inset portion of the first retainer section comprises a tapered surface, tapered, for example, at an angle of about 5° toward the shaft axis and the end face of the shaft. The second inset portion of the second retainer section is preferably in the form of a groove extending across the shaft. Consequently, upon viewing the headed end of the shaft along the shaft axis, the first section is offset laterally to one side of the circular shaft, while the second section is offset laterally to the opposite side of the shaft, i.e., the first and second projecting portions lie substantially 180° from one another about the shaft and are axially spaced from one another. The shaft head is also laterally enlarged, i.e., extends laterally beyond the peripheral confines (diameter) of the shaft at locations 90° about the shaft from the first and second projecting and inset portions.

With the forward and rearward projections of adjoining links interdigitated to align the openings therethrough with one another, the shaft is inserted, non-headed end first, until the headed end of the shaft contacts the end projection. By pressing the headed end of the shaft through the opening of the end link projection, the second projecting portion of the second retainer section displaces the headed shaft end laterally, i.e., resiliently deforms the headed end of the shaft, in a lateral direction to clear the margin of the opening. At that axial location along the shaft, the groove registers with the opposite margin of the opening through the end link projection, enabling the lateral displacement and deformation. Once the second projection portion clears the margin of the opening, the first projecting portion of the first retainer section engages the margin of the opening to displace the headed shaft end laterally in the opposite direction, i.e., resiliently deforms the head end of the shaft in the opposite lateral direction. The tapered inset surface registers with the opposite margin of the opening and enables the projection opposite side portion of the shaft to clear the opening. The headed end then resiliently returns to its original orientation but now resides in the locking slot and between adjacent interdigitated projections, hence preventing axial displacement of the shaft in either direction.

It is a feature of the present invention that the shaft can be removed and reused. To remove the shaft and hence disassemble the conveyor, the shaft is advanced axially in the direction of insertion so that the non-headed end of the shaft projects from the opposite side of the adjoining links. The shaft can then be pulled from that opposite side and removed, with the headed end passing through the registering openings of the adjoining projections. Once the link assemblies have been cleaned, the shaft can be reinserted, similarly as described, to once again join the link assemblies to one another.

In a preferred embodiment according to the present invention, there is provided a conveyor belt, comprising a plurality of links each with forward and rearward laterally spaced projections, the rearward projections of each link being interdigitated with the forward projections of an adjacent link, the interdigitated projections having laterally extending and aligned holes, a plurality of link shafts, each link shaft passing through the aligned holes of the forward and rearward projections of adjacent links for pivotally securing the links to one another, at least one of the link shafts having a headed end having a lateral dimension in excess of the diameter of the holes and disposed in a recess between laterally spaced next adjacent projections of at least a pair of adjacent links, each of the forward projections has side faces each with angularly related planar surfaces, a first planar surface of each side face extending from a top portion of the link toward a bottom portion of the link and forming an obtuse angle with a second planar surface extending from the first planar surface toward the bottom portion of the link, the first and second planar surfaces on each side of each forward projection extending toward one another from the top to the bottom portions of the link, whereby top portions of each forward projection are wider than bottom portions of the forward links, the trailing projections each having sides tapered inwardly toward one another from the top to the bottom portions of the link.

In a further preferred embodiment according to the present invention, there is provided link shaft for a conveyor having a plurality of links each with forward and rearward laterally spaced projections for interdigitating the rear projections of one link with the forward projections of an adjacent link, the interdigitated projections having laterally extending and aligned holes for receiving the link shaft, the link shaft comprising an elongated shaft having a predetermined diameter and a head adjacent one end thereof for retaining the shaft in the aligned holes of the projections of adjacent links, the head having a first retainer section including (i) a first portion at a first axial location along the shaft projecting outwardly of the peripheral confines of the shaft and along one side of the shaft and (ii) a first portion along a side of the shaft at the first axial location opposite the one side inset relative to the peripheral confines of the shaft, the head having a second retainer section including (i) a second portion at a second axial location along the shaft spaced axially from the first shaft portion and projecting outwardly of the peripheral confines of the shaft along the opposite side thereof and (ii) a second portion along one side of the shaft at said second axial location inset relative to the peripheral confines of the shaft whereby the diametrically opposite first and second projecting portions prevent removal of the shaft in axial directions when the shaft is received in the holes of the interdigitated link projections.

In a still further preferred embodiment according to the present invention, there is provided a conveyor comprising a plurality of links each with forward and rearward laterally spaced projections for interdigitating the rear projections of one link with the forward projections of an adjacent link, the interdigitating projections having laterally extending and aligned holes, link shafts received in the holes for joining the links to one another, at least one of the link shafts having a predetermined diameter less than the diameter of the holes and a head adjacent one end thereof for retaining the shaft in the aligned holes of the projections of a pair of adjacent links, the head having a first retainer section including a first portion at a first axial location along the shaft projecting outwardly of the peripheral confines of the shaft and along one side of the shaft such that the lateral dimension between the first portion along the one shaft side and an opposite second side of the shaft exceeds the diameter of the holes, the head having a second retainer section including a second portion at a second axial location along the shaft spaced axially from the first shaft portion and projecting outwardly of the peripheral confines of the shaft along the opposite second side thereof such that the lateral dimension between the second portion along the opposite second side thereof and the one shaft side exceeds the diameter of the holes.

Accordingly, it is a primary object of the present invention to provide a novel and improved conveyor formed of links having projections interdigitated one with the other and connecting shafts which are releasably locked in place and reusable.

BRIEF DESCRIPTION OF THE DRAWINGS

FIG. 3 is an enlarged view of a leading projection on one of the links;

FIG. 4 is a side elevational view of a link;

FIG. 5 is an enlarged cross-sectional view taken through a forward projection illustrating the alignment of forward and rearward projections of adjoining links;

FIG. 7 is a side elevational view of the headed end of the link shaft joining the links to one another;

FIG. 8 is a view similar to FIG. 7, with the shaft rotated 90°;

BEST MODE FOR CARRYING OUT THE INVENTION

Figure 1:
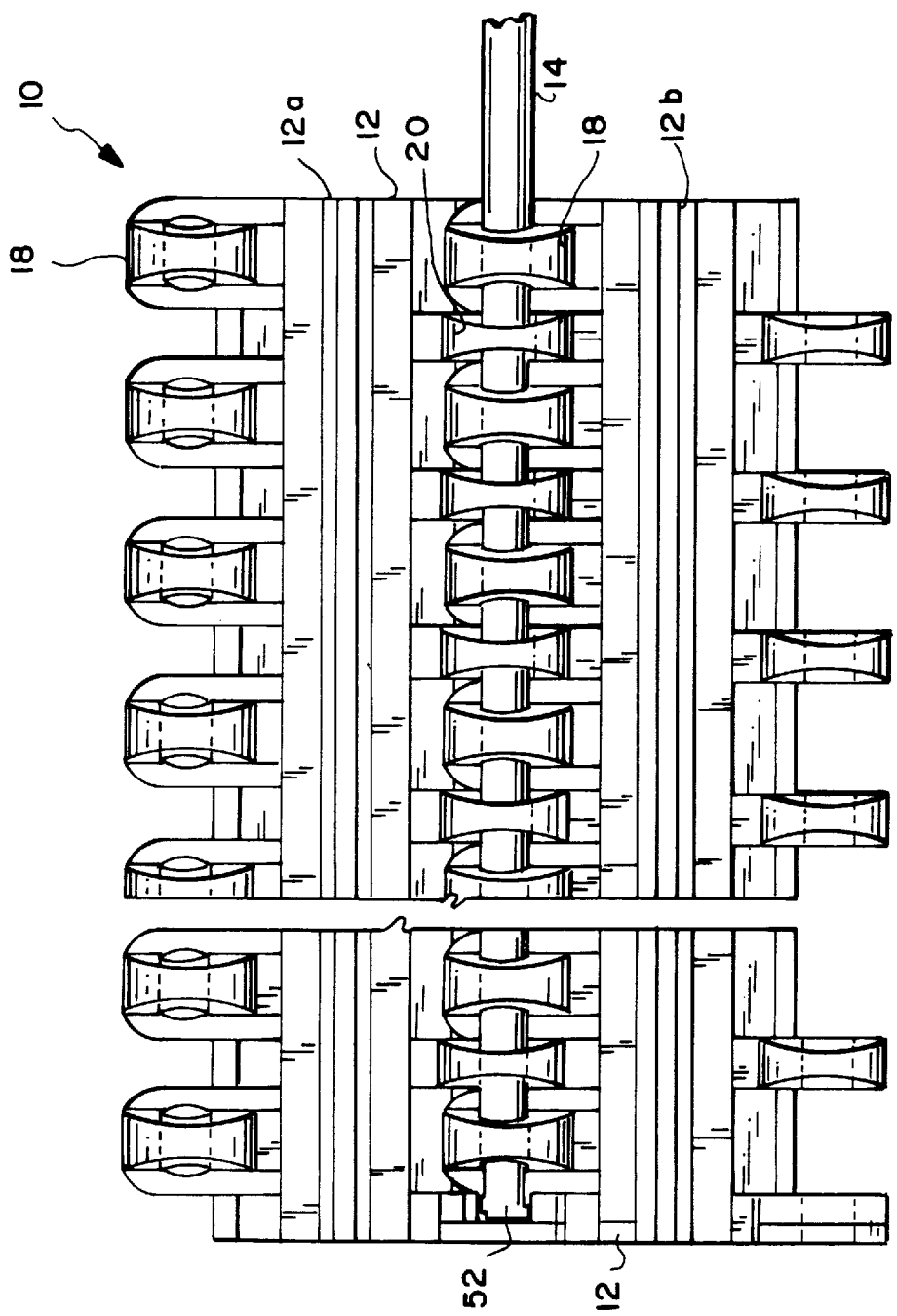
FIG. 1 is a bottom plan view of a pair of links joined one to the other by a link shaft according to the present invention.

Referring now to the drawings, there is illustrated in FIG. 1 a portion of a conveyor assembly, generally designated 10, comprising a plurality of links, two such links 12 being illustrated and coupled together by an elongated link shaft 14. It will be appreciated that while only two links 12a and 12b are illustrated, the conveyor belt 10 comprises a plurality of such links, coupled one to the other by a plurality of shafts 14 forming a endless continuous conveyor belt. It will also be appreciated that the belt 10 can be driven by any suitable means, not shown, including various gears or wheels which interconnect with the link assemblies to drive the conveyor 10.

Figure 2:
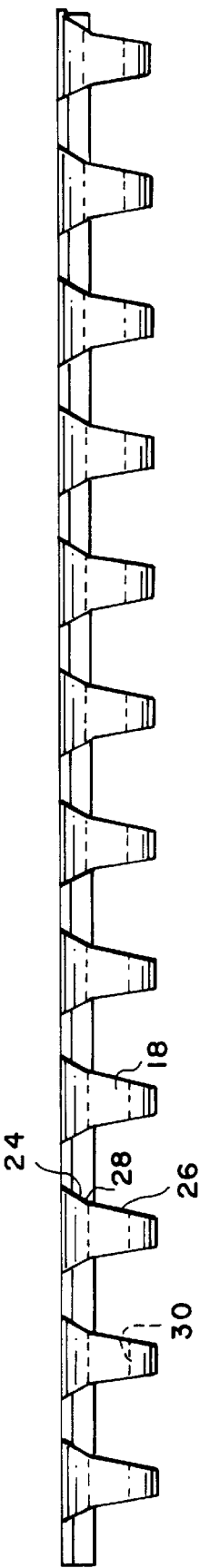
FIG. 2 is a front elevational view of a link assembly according to the present invention.

Each link includes a central body portion 16 having a plurality of laterally spaced forward projections 18 and a plurality of laterally spaced rearward projections 20. As illustrated in FIG. 1, the projections 18 and 20 are laterally offset one from the other. Thus, the trailing or rearward links 20 of each link, for example, link 12a, may be interdigitated between the forward links 18 of the next link 12b. That is, the trailing projections 20 may lie between the spaces of the forward projections 18 of the next link. Referring particularly to FIGS. 1 and 2, the forward projections 18 have opposite side faces, each with angularly related planar surfaces 24 and 26. For example, and referring to FIG. 2, each of the forward projections 18 has a first planar surface 24 along opposite sides, which surfaces extend toward one another in a direction toward the bottom of the conveyor. A second planar surface 26 is formed on each side of the projections 18 and similarly tapers toward the bottom of the link. The taper of each of the surfaces 24 and 26 is different and these surfaces intersect one another along an apex 28.

Thus, the surfaces 24 and 26 on each side of each forward projection 18 extend toward one another from the top of the link to the bottom of the link whereby top portions of each forward projection are wider than the bottom portions of the forward projections as illustrated in FIGS. 2 and 3.

It will also be appreciated from a review of these drawing figures that each of the projections 18 has a laterally extending circular aperture 30 between opposite sides. The apertures 30 of the projections of each link are in axial alignment one with the other in the lateral direction of the conveyor. It will be appreciated from a review of FIG. 3 that each aperture 30 opens through a portion of the lower side surface 26, as well as a portion of an upper surface 24, and thus intersects the apex 28. As will be appreciated, the aligned apertures 30 are designed to receive the shaft 14 by which the conveyor links 12 are articulated to one another.

Figure 6:
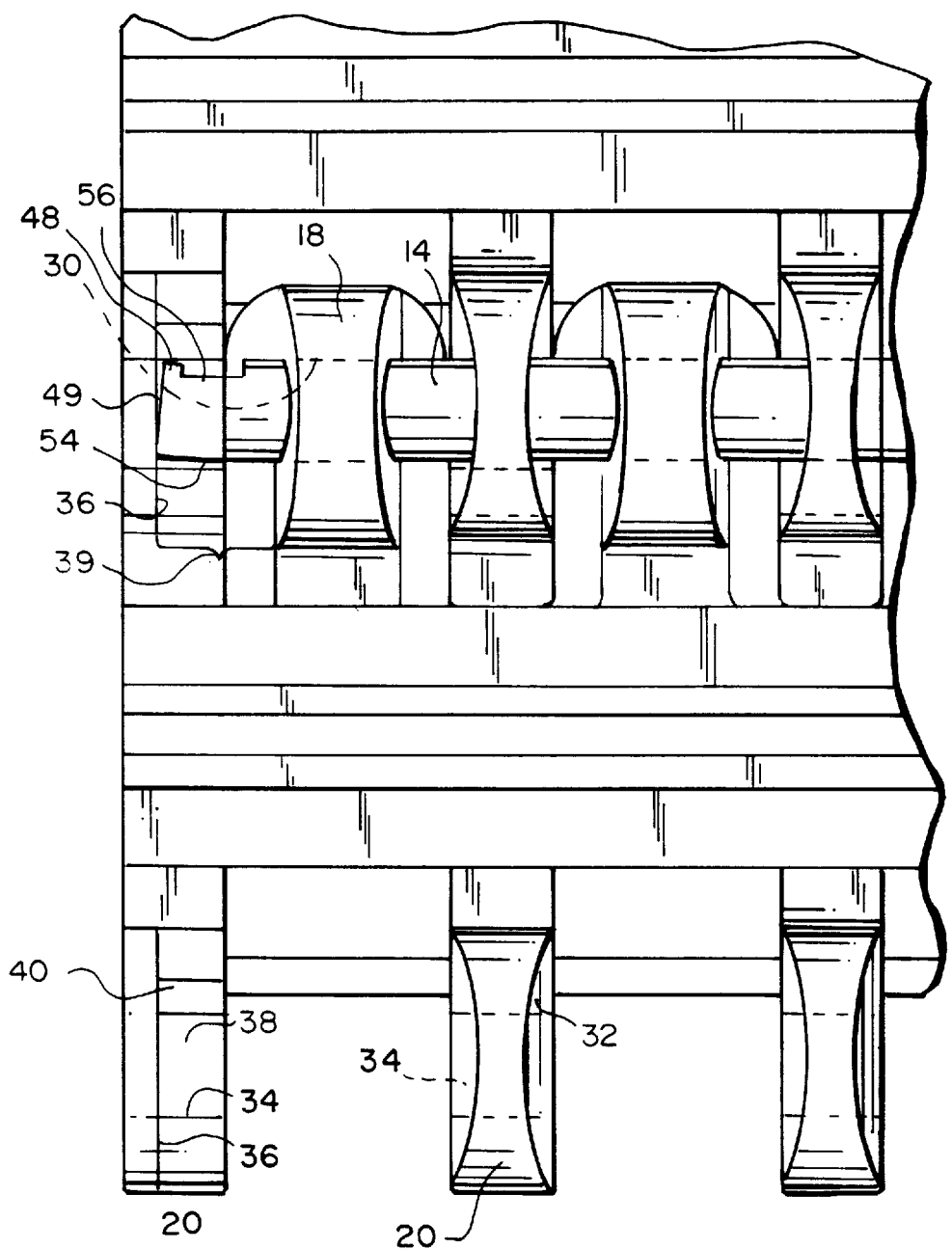
FIG. 6 is an enlarged fragmentary bottom plan view of the links, similarly as illustrated in FIG. 1 and illustrating an end locking slot.
Figure 9:
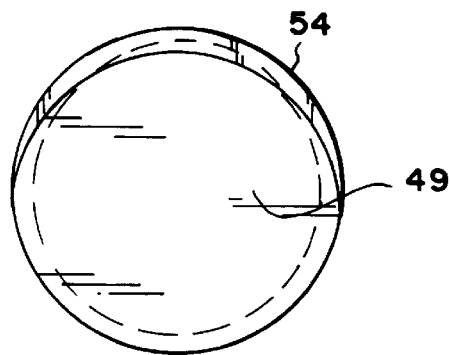
FIG. 9 is an end elevational view of the headed end of the shaft of FIG. 7.
Figure 10:
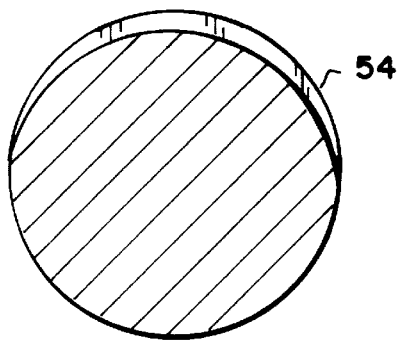
FIGS. 10 and 11 are cross-sectional views of the headed end of the shaft taken generally about on lines 10—10 and 11—11, respectively, of FIG. 7.
Figure 11:
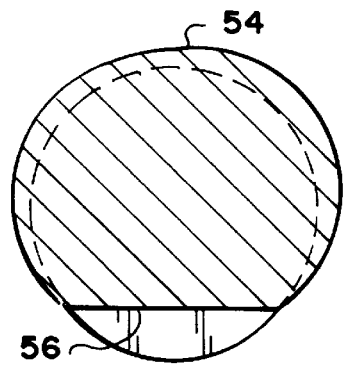

Referring now to FIG. 6, the rearward or trailing projections 20 have side wall surfaces which taper continuously downwardly from the top of the link toward the bottom of the link. That is, each of the side walls of each rearward projection 20 has a linear taper toward the opposite side wall of the projection and from the top of the link to its bottom. Each projection 20 also includes an aperture 34 in axial alignment in a lateral direction of the conveyor with apertures 34 of adjacent projections 20 whereby a link shaft 14 can be disposed through the apertures 34 of the trailing projections 20 when the forward and trailing projections of adjacent links are interdigitated.

From a review of FIG. 6, the end projection 20 on one side of the conveyor has an enlarged recess 36 along its inner face. That is, the inner face of an end projection of each link has a cut-out forming a locking slot 38. The lateral distance between the recessed inner face 36 of the end projection 20 including the locking slot 38 and the side face of the next adjacent projection 18 forms a locking cavity 39 for the headed end of the shaft as described below.

Additionally, each link has a transversely extending rib 40 (FIG. 4) projecting downwardly from its undersurface. The lowermost extremity of the rib 40 is inset from a plane extending between the lowermost extremities of the forward and rearward projections 18 and 20, respectively.

Referring now to FIGS. 7–11, each link shaft 14 includes a headed end 44 and a plain opposite end, not shown. The headed end 44 includes first and second retainer sections for retaining the shaft against axial movement when disposed in the aligned openings of adjacent interdigitated links. The first retainer section 46 lies adjacent the end face 49 of the shaft and has a first portion 48 projecting outwardly of the peripheral confines of the shaft, i.e., projecting as illustrated in drawing FIG. 7 downwardly beyond the lower diameter of the shaft. The opposite side of the shaft has a first portion 50 inset from the peripheral confines of the shaft. The second retainer section 52 has a second portion 54 which projects outwardly of the peripheral confines of the shaft along the opposite side of the shaft from the first outwardly projecting portion 48. On the same side of the shaft as the first projecting portion 48, the second retaining section 52 has a second portion 56 inset from the peripheral confines of the shaft. As illustrated, the first retainer section 46 lies intermediate the end face 49 of the shaft and the second retainer section 52.

The first inset portion 50 of the first retainer section 46 comprises a tapered surface, i.e., tapered at an angle toward the shaft axis and the end face 48. The taper is indicated by the angle a and is preferably about 5°. The second inset portion 56 of the second retainer section 52 is in the form of a transverse groove extending across the shaft. As illustrated in FIG. 7, it will be seen that the first and second projecting portions 48 and 54, respectively, lie on diametrically opposite sides of the shaft and project outside of the peripheral confines of the shaft.

This unique configuration of the headed end of the shaft is performed by a stamping die operation. It will be appreciated that the shafts may be formed of polyethylene or polypropylene. When a plain circular shaft end is disposed within the die to form the headed end, cold deformation of the headed end occurs which laterally enlarges the shaft at areas approximately 90° from the projecting portions 48 and 54. This is illustrated in FIG. 8, which discloses laterally enlarged portions 58.

To assemble the conveyor links, the forward and rearward projections of adjoining links are interdigitated to align the openings therethrough with one another. The non-headed end of the shaft is then inserted through the aligned transverse openings, starting at the side of the link which has the locking slot. When the headed end of the shaft butts up against the opening to the locking slot, it will be appreciated that the diameter of the opening is slightly less than the diameter of the shaft plus the diametrical offset of one of the projecting portions 48 or 54. Consequently, the headed end cannot be readily passed through the opening. By applying pressure to the headed end, the second projecting portion 54 bears against the margin of the opening to displace the headed shaft end laterally, i.e., resiliently deforming the headed end of the shaft in a lateral direction to clear the margin of the opening. With the groove 56 diametrically opposite the second projection 54, it will be appreciated that the groove registers with the opposite margin of the opening through the end link projection, enabling the lateral displacement and deformation of the headed end. Upon further insertion of the headed end into the openings of the interdigitated links, the second projection 48 will bear against the margin of the opening, preventing further movement. By applying additional pressure, the projecting portion 48 displaces the headed shaft end laterally in the opposite direction, i.e., resiliently deforms and displaces the head laterally to clear the margin of the opening. It will be appreciated that the opposite inset tapered surface 50 enables the headed shaft to deform and thus pass through the opening of the end projection.

As illustrated in FIG. 6, the headed end of the shaft then rests between that end link projection 20 and the adjacent projection 18 and in the locking cavity 39 including lock slot 38 of the end link projection. Once in that cavity 39, the headed end returns to its original configuration position which precludes axial displacement of the shaft in the direction of insertion by the abutment of projecting portion 54 against the margin of the opening of the link and removal of the shaft in the opposite axial direction by abutment of the projecting portion 48 against the end link opening.

The shaft with the headed end can be readily removed and reused when the conveyor is disassembled and reassembled. To accomplish this, the shaft is removed by inserting a tool to bear against the end face 48 of the shaft. In this manner, the shaft can be displaced or pressed axially through the aligned openings in the same direction as the shaft was originally inserted through the aligned openings until the headed end emerges from the final opening at the opposite side of the conveyor links. To reassemble the links using the same shaft, the shaft is reinserted similarly as it was originally inserted as described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A conveyor belt, comprising:

a plurality of links each with forward and rearward laterally spaced projections, the rearward projections of each link being interdigitated with the forward projections of an adjacent link, the interdigitated projections having laterally extending and aligned holes;

a plurality of link shafts, each link shaft passing through the aligned holes of the forward and rearward projections of adjacent links for pivotally securing the links to one another, at least one of said link shafts having a headed end having an overall diameter dimension in excess of the diameter of said holes and disposed in a recess between laterally spaced next adjacent projections of at least a pair of adjacent links;

said headed shaft end including first and second axially spaced retainer sections each said retainer section having a projecting portion and an inset portion such that at each axial location of said first and second retainer sections at least the projecting portion extends outwardly of the peripheral confines of the shaft;

each of the forward projections has side faces each with angularly related planar surfaces, a first planar surface of each side face extending from a top portion of the link toward a bottom portion of the link and forming an obtuse angle with a second planar surface extending from said first planar surface toward the bottom portion of the link, the first and second planar surfaces on each side of each forward projection extending toward one another from the top to the bottom portions of the link, whereby top portions of each forward projection are wider than bottom portions of said forward links;

said trailing projections each having sides tapered inwardly toward one another from the top to the bottom portions of the link.

2. A conveyor belt according to claim 1 wherein the holes through the forward projections intersect both the first and second planar surfaces on each of the opposite sides of said forward projections.

3. A conveyor belt according to claim 1 wherein each link has a body portion between the forward and rearward projections, and a rib projecting from a bottom of said body portion and extending continuously between opposite sides of said link.

4. A conveyor belt according to claim 3 wherein said rib projects from said body a distance short of the bottom portions of the forward and rearward extending links.

5. A conveyor belt according to claim 1 wherein a first projection adjacent one side of one of said pair of links has a locking recess formed through an inner side wall thereof, the headed end of said one link shaft being received in said recess.

6. A link shaft for a conveyor having a plurality of links each with forward and rearward laterally spaced projections for interdigitating the rear projections of one link with the forward projections of an adjacent link, the interdigitated projections having laterally extending and aligned holes for receiving the link shaft, said link shaft comprising:

an elongated shaft having a predetermined diameter and a head adjacent one end thereof for retaining the shaft in the aligned holes of the projections of adjacent links;

said head having a first retainer section including (i) a first projecting portion at a first axial location along said, shaft projecting outwardly of the peripheral confines of said shaft and along one side of the shaft and (ii) a first inset portion along a side of said shaft at said first axial location opposite said one side inset relative to the peripheral confines of the shaft;

said head having a second retainer section including (i) a second projecting portion at a second axial location along said shaft spaced axially from said first projecting portion and projecting outwardly of the peripheral confines of said shaft along said opposite side thereof and (ii) a second inset portion along said one side of said shaft at said second axial location inset relative to the peripheral confines of said shaft hereby said diametrically opposite first and second projecting portions prevent removal of said shaft in axial directions when said shaft is received in the holes of the interdigitated link projections.

7. A link shaft according to claim 6 wherein said first inset portion includes a surface tapered at an angle relative to the axis of said shaft.

8. A link shaft according to claim 7 wherein said first projecting portion and said inset first portion lie adjacent said one shaft end and axially between (i) said one shaft end and (ii) said second projecting portion and said second inset portion.

9. A link shaft according to claim 7 wherein said tapered surface extends from said second projecting portion to said one shaft end.

10. A link shaft according to claim 6 wherein said second inset portion comprises a groove formed along said one side of said shaft.

11. A link shaft according to claim 6 wherein said head includes a laterally enlarged portion of said shaft at locations about said shaft displaced substantially 90° from said first and second projecting and inset portions, said laterally enlarged portion extending beyond the peripheral confines of said shaft.

12. A link shaft according to claim 11 wherein said first inset portion includes a surface tapered at an angle relative to the axis of said shaft, said tapered surface extending from said second projecting portion to said one shaft end and said second inset portion comprising a groove formed along said one side of said shaft.

13. A conveyor comprising:

a plurality of links each with forward and rearward laterally spaced projections for interdigitating the rear projections of one link with the forward projections of an adjacent link, the interdigitating projections having laterally extending and aligned holes;

link shafts received in said holes for joining the links to one another, at least one of said link shafts having a predetermined diameter less than the diameter of the holes and a head adjacent one end thereof for retaining the shaft in the aligned holes of the projections of a pair of adjacent links;

said head having a first retainer section including a first projecting portion at a first axial location along said shaft projecting outwardly of the peripheral confines of said shaft and along one side of the shaft such that the diameter dimension between said first projecting portion along said one shaft side and an opposite second side of said shaft exceeds the diameter of said holes, a first inset portion along a side of said shaft at said first axial location opposite said one side and inset relative to the peripheral confines of the shaft;

said head having a second retainer section including a second projecting portion at a second axial location along said shaft spaced axially from said first projecting portion and projecting outwardly of the peripheral confines of said shaft along said opposite second side thereof such that the diameter dimension between said second projecting portion along said opposite second side thereof and said one shaft side exceeds the diameter of said holes, a second inset portion along said one side of said shaft at said second axial location inset relative to the peripheral confines of said shaft;

whereby said diametrically opposite first and second projecting portions prevent removal of said shaft in axial directions when said shaft is received in the holes of the interdigitated link projections.

14. A conveyor according to claim 13 wherein a first projection adjacent one side of one of said pair of links has a locking recess formed through an inner side thereof, the headed end of said one link shaft being received in said recess.

15. A conveyor according to claim 13 wherein said first inset portion includes a surface tapered at an angle relative to the axis of said shaft.

16. A conveyor according to claim 13 wherein said first projecting portion and said first inset portion lie adjacent said one shaft end and axially between (i) said one shaft end and (ii) said second projecting portion and said second inset portion.

17. A conveyor according to claim 15 wherein said tapered surface extends from said second projecting portion to said one shaft end.

18. A conveyor according to claim 13 wherein said second inset portion comprises a groove formed along said one side of said shaft.

19. A conveyor according to claim 13 wherein said head includes a laterally enlarged portion of said shaft at locations about said shaft displaced substantially 90° from said first and second projecting and inset portions, said laterally enlarged portion extending beyond the peripheral confines of said shaft.

* * * * *